United States Patent [19]
Walker

[11] 3,903,799
[45] Sept. 9, 1975

[54] METHOD OF BLASTING

[76] Inventor: Richard E. Walker, 237 Charleston St., Cadiz, Ohio 43907

[22] Filed: Sept. 20, 1973

[21] Appl. No.: 399,132

[52] U.S. Cl. ................................................. 102/23
[51] Int. Cl.$^2$ ............................................. F42D 1/06
[58] Field of Search ............................... 102/22, 23

[56] References Cited
UNITED STATES PATENTS

| | | | |
|---|---|---|---|
| 2,725,821 | 12/1955 | Coleman | 102/22 |
| 2,725,822 | 12/1955 | Janelid | 102/22 |
| 3,295,445 | 1/1967 | Ball et al. | 102/23 |
| 3,618,519 | 11/1971 | Griffith | 102/22 |

Primary Examiner—Verlin R. Pendegrass
Attorney, Agent, or Firm—William P. Hickey

[57] ABSTRACT

A method of blasting which allows greater amounts of explosives to be detonated at one shooting than was possible by prior art methods while at the same time holding the maximum vibration produced at or below levels produced by a single detonation. A plurality of charges are arranged in spaced apart rows with the detonations within a row being detonated with time delays of 10 milliseconds or more and with the detonations between successive rows being detonated with time delays of from 25 to 150 milliseconds.

18 Claims, 3 Drawing Figures

| CIRCUIT NO.: | 10 | 9 | 8 | 7 | 6 | 5 | 4 | 3 | 2 | 1 | |
|---|---|---|---|---|---|---|---|---|---|---|---|
| CIRCUIT TIME: | 540 | 480 | 420 | 360 | 300 | 240 | 180 | 120 | 60 | 0 | |
| | + | + | + | + | + | + | + | + | + | + | |
| TIME DEL.: | 125 | 125 | 125 | 125 | 125 | 125 | 125 | 125 | 125 | 125 | |
| DET. TIME: | 665 | 605 | 545 | 485 | 425 | 365 | 305 | 245 | 185 | 125 | Row 5 |
| TIME DEL.: | 100 | 100 | 100 | 100 | 100 | 100 | 100 | 100 | 100 | 100 | |
| DET. TIME: | 640 | 580 | 520 | 460 | 400 | 340 | 280 | 220 | 160 | 100 | Row 4 |
| TIME DEL.: | 75 | 75 | 75 | 75 | 75 | 75 | 75 | 75 | 75 | 75 | |
| DET. TIME: | 615 | 555 | 495 | 435 | 375 | 315 | 255 | 195 | 135 | 75 | Row 3 |
| TIME DEL.: | 50 | 50 | 50 | 50 | 50 | 50 | 50 | 50 | 50 | 50 | |
| DET. TIME: | 590 | 530 | 470 | 410 | 350 | 290 | 230 | 170 | 110 | 50 | Row 2 |
| TIME DEL.: | 25 | 25 | 25 | 25 | 25 | 25 | 25 | 25 | 25 | 25 | |
| DET. TIME: | 565 | 505 | 445 | 385 | 325 | 265 | 205 | 145 | 85 | 25 | Row 1 |

- - - - - - - - - - - - - - - - - - - - OPEN FACE - - - - - - - - - - - - - - - - - - - - - - - -

FIGURE 1
BLAST SCHEDULE

| CIRCUIT NO.: | 10 | 9 | 8 | 7 | 6 | 5 | 4 | 3 | 2 | 1 | |
|---|---|---|---|---|---|---|---|---|---|---|---|
| CIRCUIT TIME: | 540 | 480 | 420 | 360 | 300 | 240 | 180 | 120 | 60 | 0 | |
| | + | + | + | + | + | + | + | + | + | + | |
| TIME DEL.: | 125 | 125 | 125 | 125 | 125 | 125 | 125 | 125 | 125 | 125 | Row 5 |
| DET. TIME: | 665 | 605 | 545 | 485 | 425 | 365 | 305 | 245 | 185 | 125 | |
| TIME DEL.: | 100 | 100 | 100 | 100 | 100 | 100 | 100 | 100 | 100 | 100 | Row 4 |
| DET. TIME: | 640 | 580 | 520 | 460 | 400 | 340 | 280 | 220 | 160 | 100 | |
| TIME DEL.: | 75 | 75 | 75 | 75 | 75 | 75 | 75 | 75 | 75 | 75 | Row 3 |
| DET. TIME: | 615 | 555 | 495 | 435 | 375 | 315 | 255 | 195 | 135 | 75 | |
| TIME DEL.: | 50 | 50 | 50 | 50 | 50 | 50 | 50 | 50 | 50 | 50 | Row 2 |
| DET. TIME: | 590 | 530 | 470 | 410 | 350 | 290 | 230 | 170 | 110 | 50 | |
| TIME DEL.: | 25 | 25 | 25 | 25 | 25 | 25 | 25 | 25 | 25 | 25 | Row 1 |
| DET. TIME: | 565 | 505 | 445 | 385 | 325 | 265 | 205 | 145 | 85 | 25 | |
| | — | — | — | — | — | — | — | — | — | — | |

------ OPEN FACE ------

FIGURE 2

BLAST SCHEDULE

| CIRCUIT NO.: | 10 | 9 | 8 | 7 | 6 | 5 | 4 | 3 | 2 | 1 | |
|---|---|---|---|---|---|---|---|---|---|---|---|
| CIRCUIT TIME: | 900 | 800 | 700 | 600 | 500 | 400 | 300 | 200 | 100 | 0 | |
|  | + | + | + | + | + | + | + | + | + | + | |
| TIME DEL.: | 100 | 100 | 100 | 100 | 100 | 100 | 100 | 100 | 100 | 100 | Row 4 |
| DET. TIME: | 1000 | 900 | 800 | 700 | 600 | 500 | 400 | 300 | 200 | 100 | |
| TIME DEL.: | 75 | 75 | 75 | 75 | 75 | 75 | 75 | 75 | 75 | 75 | Row 3 |
| DET. TIME: | 975 | 875 | 775 | 675 | 575 | 475 | 375 | 275 | 175 | 75 | |
| TIME DEL.: | 50 | 50 | 50 | 50 | 50 | 50 | 50 | 50 | 50 | 50 | Row 2 |
| DET. TIME: | 950 | 850 | 750 | 650 | 550 | 450 | 350 | 250 | 150 | 50 | |
| TIME DEL.: | 25 | 25 | 25 | 25 | 25 | 25 | 25 | 25 | 25 | 25 | Row 1 |
| DET. TIME: | 925 | 825 | 725 | 625 | 525 | 425 | 325 | 225 | 125 | 25 | |
|  | — | — | — | — | — | — | — | — | — | — | |

- - - - - - - OPEN FACE - - - - - - -

FIGURE 3
BLAST SCHEDULE

| C.N.: | 10 | 9 | 8 | 7 | 6 | 5 | 4 | 3 | 2 | 1 | |
|---|---|---|---|---|---|---|---|---|---|---|---|
| C.T.: | 540 | 480 | 420 | 360 | 300 | 240 | 180 | 120 | 60 | 0 | |
| | + | + | + | + | + | + | + | + | + | + | |
| T.D.: | 650 550 | 650 550 | 650 550 | 650 550 | 650 550 | 650 550 | 650 550 | 650 550 | 650 550 | 650 550 | Row 6 |
| D.T.: | 1190 1090 | 1130 1030 | 1070 970 | 1010 910 | 950 850 | 890 790 | 830 730 | 770 670 | 710 610 | 650 550 | |
| T.D.: | 500 450 | 500 450 | 500 450 | 500 450 | 500 450 | 500 450 | 500 450 | 500 450 | 500 450 | 500 450 | Row 5 |
| D.T.: | 1040 990 | 980 930 | 920 870 | 860 810 | 800 750 | 740 690 | 680 630 | 620 570 | 560 510 | 500 450 | |
| T.D.: | 400 350 | 400 350 | 400 350 | 400 350 | 400 350 | 400 350 | 400 350 | 400 350 | 400 350 | 400 350 | Row 4 |
| D.T.: | 940 890 | 880 830 | 820 770 | 760 710 | 700 650 | 640 590 | 580 530 | 520 470 | 460 410 | 400 350 | |
| T.D.: | 300 250 | 300 250 | 300 250 | 300 250 | 300 250 | 300 250 | 300 250 | 300 250 | 300 250 | 300 250 | Row 3 |
| D.T.: | 840 790 | 780 730 | 720 670 | 660 610 | 600 550 | 540 490 | 480 430 | 420 370 | 360 310 | 300 250 | |
| T.D.: | 200 150 | 200 150 | 200 150 | 200 150 | 200 150 | 200 150 | 200 150 | 200 150 | 200 150 | 200 150 | Row 2 |
| D.T.: | 740 690 | 680 630 | 620 570 | 560 510 | 500 450 | 440 390 | 380 330 | 320 270 | 260 210 | 200 150 | |
| T.D.: | 100 50 | 100 50 | 100 50 | 100 50 | 100 50 | 100 50 | 100 50 | 100 50 | 100 50 | 100 50 | Row 1 |
| D.T.: | 640 590 | 580 530 | 520 470 | 460 410 | 400 350 | 340 290 | 280 230 | 220 170 | 160 110 | 100 50 | |

- - - - - - - - - - - - - - - OPEN FACE - - - - - - - - - - - - - - -

METHOD OF BLASTING

BACKGROUND OF THE INVENTION

The art of blasting has existed since the start of the Industrial Revolution, and for a great number of years electrical blasting caps of 25, 50, 75, 100, 125, 150, 175, 200, 250, 300, 350, 400, 450, 500, 550, 600, 650, 700, 800, 900, and 1,000 millisecond delays have existed. These caps are so constructed as to detonate at approximately the designated number of milliseconds after the electrical detonating impulse has been delivered to the cap. The prior art has arranged several rows of explosives paralleling a quarry face using the same millisecond time delay cap for each charge in a particular row but increasing the time delay used in each succeeding row spaced from the quarry face, so as to cause a crack to develop longitudinally along the line of the blast charges and thereby peel one layer of rock at a time into the open quarry. The first row adjacent the quarry face would usually be detonated by caps of 25 millisecond delay. The second row usually being ignited by caps of 50 millisecond delay, the third by 75 millisecond delay, and the fourth by 100 millisecond delay.

Blasts, of course, produce shock waves which travel in rock at rates of from approximately 10,000 to 18,000 feet per second, and the intensity of these shock waves is generally a function of the amount of explosive that is detonated at one time. These shock waves decrease in intensity as they proceed away from the blast area, and will produce degrees of movement depending upon the soil conditions through which they pass. Rock, for example, has a high pseed of shock wave propagation, but a relatively low degree of movement. Sand and soil, on the other hand, have a lower rate of shock wave propagation, but undergo a greater degree of displacement. Shock waves transmitted to buildings produce a physical movement of the building depending upon the soil condition, distance from the blast, and the amount of explosive that is detonated at one time. When detonating explosives in proximity to buildings, the prior art, using prior art techniques has, therefore, either reduced the amount of explosive in each hole so that the total amount of explosive did not exceed the legal allowable limit, or have limited themselves to one blast at a time.

An object of the present invention is the provision of a new and improved method of blasting which produces a minimum of shock wave and a maximum amount of rock removal per detonation.

Another object of the present invention is the provision of a new and improved method of blasting which sequences blasts in such manner that the shock wave of each blast is attentuated before detonation of the next blast is initiated, but wherein the time delay between blasts is so controlled so that each detonation increases rock fracturing power and the rock removal power of the previous detonation.

Another object of the present invention is the provision of new and improved blasting patterns giving greater rock removal than would the same amount of explosive detonated by prior art techniques.

Another object of the present invention is the provision of a new and improved method of blasting which permits a greater total amount of explosive to be detonated at one time than has been done heretofore without damaging adjacent buildings.

Further objects and advantages of the invention will become apparent to those skilled in the art to which the invention relates from the following description of several preferred embodiments described with reference to the accompanying drawings and claims.

FIG. 1 is a blasting schedule embodying principles of the present invention;

FIG. 2 is another blasting schedule embodying principles of the present invention; and FIG. 3 is still another blasting schedule embodying principles of the present invention.

DESCRIPTION OF THE PREFERRED EMBODIMENTS

According to one of the principles of the present invention, it has been discovered that an optimum range in time delay exists between detonations within a row paralleling an open face, and that another and differing optimum range in time delay exists with respect to successive rows paralleling the open face. The prior art has thought that time delays of 8 seconds or less was sufficient for complete attenuation of the shock waves that are detrimental to buildings. The prior art has arrived at this conclusion based on seismographic readings that were taken of rock structure.

According to another principle of the present invention it has been discovered that 8 millisecond time delay is a bare minimum and may not produce minimal vibrations in buildings, apparently because of their period of vibration and that the time delay optimumly is 10 to 15 milliseconds or more, and in some cases 25 milliseconds. For optimum results it has been found that the time delay between detonations within a row paralleling an open face is preferably within the range of from 10 to 20 milliseconds in rotational order.

It has been said that as many as 6 different types of shock wave patterns result from underground blasts, and that in addition there are noise waves transmitted through the air as well as fragmentation and physical movement of the fragmented rock. The energy involved in each of these phenomena comes from the total energy that is released by the blast, and the analysis of all of these different energy phenomena is beyond present day scientific capability. Although the reasons for the effectiveness of applicant's newly discovered blast patterns are not fully understood, it is theorized that there are at least three distinct and identifiable stages which occur within rock immediately following a detonation.

Applicant believes that the first stage involves the production of fissures within the rock due to the pushing and pulling of the rock that occurs by reason of plastic deformation, and which accompanies the transmittal of the initial shock wave or waves. The initial shock wave produces wave portions of high and low density, which wave portions, when severe enough, produce compressive areas which pull away from the rock in the low density areas to create fissures. This fissure-producing phenomenon progresses away from the area of the blast until such time as the shock wave intensity has decreased to where plastic deformation of the rock allows it to flow from the high density back into the low density areas without the production of fissures.

Applicant believes that a second stage occurs in which there is crack propagation between these fissures and which crack propagation is produced by stress concentration of rock which has started to separate in the area adjacent the blast. The separation is analogous to the peeling or separating of laminents and which results in stress concentration in the connected area between the laminents. This stress concentration due to bending moment causes cracks to jump between the fissures that had previously been created by the shock waves. Movement of the rock during this second stage is, of course, minimal, so that substantially no release of the high pressure gases that were produced by the blast occurs during this stage. The high pressure gases, however, flow down the fractures prior to the time that the fractures open to the surface and are vented. During this second stage, rock acceleration begins to effectively occur.

The next stage envisioned by applicant is the rock removal stage wherein the velocity of the rock is not appreciable, and during which the venting of the gases occurs. This results in a decrease in acceleration, and a physical movement of the rock by reason of the momentum that has been developed. Because of the great mass of the rock an appreciable period of time is required for the rock to physically move out of the area of the blast, it is believed that the fissure production occurs within 0 to 10 milliseconds of blast initiation, that the crack propagation proceeds from approximately 10 to 60 milliseconds after detonation, and that venting and subsequent rock removal starts after approximately 100 milliseconds following the detonation.

From applicant's proven results, it is further theorized that greater fissure production and crack propagation is produced when the blasts in successively deeper rows away from an open face occur with approximately 100 millisecond delay. It is believed that pressure energy from the first row detonation is still being held against the rock at the time that the detonation of the second row occurs. A critical time period exists, however, in that the rock between the first row and open face must start to move away from and make room for the rock removal stage of the second row at about 100 milliseconds delay from the time that the first row detonation occurred. Such time spacing between the rows allows the detonations in the outer row to achieve maximum crack propagation and also hold pressure against the second row to increase rock compression forces during detonation of the second row and thereby increase fissure production by the second row. Immediately after the second row blast initiation, and while crack propagation is developing in the second row the first row is being vented and the rock between the open face and the first row has started to move and make way for the rock that is about to be dislodged by the second row blasts.

Applicant has further found that his method of blasting decreases the amount of projectiles coming from the blasting area and this is believed to be due to the fact that his method of blasting utilizes the moving wall of rock ahead of each successive row as a shield for the high velocity projectiles resulting from the more easily fragmented areas within the body of rock. The time delay between rows therefore is also critical.

According to a further feature of applicant's invention, electronic cap ignition is used to provide a delay that exceeds the standard millisecond spacing of the time delay caps that are used by a predetermined fraction of the delay cap interval. This arrangement causes the detonations to have predetermined repeating detonation pattern for sub-groups of detonations. It turns out that respective detonations of each sub-group occur together in a pattern, and that these detonations are spaced by such a distance that the shock waves proceeding away from the open face are out of phase with each other. This does not occur when blasts adjacent each other are ignited simultaneously.

By way of examples of blast patterns of the present invention, the following examples of charts or time schedules are given.

The blast schedule of FIG. 1 utilizes some of the principles of the present invention but not all of them. The schedule provided ignites 50 individual blasts that are arranged in 5 rows that are parallel to the open quarry face and each row contains 10 blasts. All of the time delay caps in row 1 have 25 milliseconds delay as indicated by the row of numbers opposite the words "Time Del." in the left hand column. All of the caps in row 2 have 50 millisecond time delay as indicated by the numerals 50 opposite the words "Time Del." in the left hand column. Similarly, the time delays of the caps in rows 3, 4, and 5 are 75, 100, 125 milliseconds, respectively.

The first blasting charges of each row are connected together and ignited by an electrical wire or circuit to which a positive ignition current flow is supplied by an electronic blasting machine of the type shown and described in application Ser. No. 357,826, filed May 7, 1973. The individual caps are in parallel circuit with one end attached to the circuit wire coming from the blast machine, and the other end of the caps are grounded.

Similarly, the second charges of each row are ignited by a second circuit similarly arranged and to which a signal from the blasting machine is given with 60 milliseconds delay following energization of the first circuit. Similarly, the third members of each row are connected together by a third circuit; as are the fourth, fifth, sixth, seventh, eighth, ninth, and tenth charges in each row. The blasting machine provides a signal to the first circuit with no time delay; it provides a signal to the second circuit with 60 milliseconds time delay; the third with 120, the fourth with 180, the fifth with 240, the sixth with 300, the seventh with 360, the eighth with 420, the ninth with 480, and the tenth with 540 milliseconds time delay. Beneath the cap designation for each charge is its total delay of ignition as obtained by combining the time delay of the blasting machine circuit and the time delay burn of the cap. The total time delay for each individual blast is designated by the numbers in the rows opposite the words "Det. Time" which stands for detonation time. For example, the ignition of the second circuit charge in row 1 occurs at 85 milliseconds after 0 time or actuation of the blasting machine, the ignition of the third circuit charge in row 1 occurs at 145 milliseconds after 0 time, the fourth at 205 milliseconds, the fifth at 265 milliseconds, the sixth at 325 milliseconds, the seventh at 385 milliseconds, the eighth at 445 milliseconds, the ninth at 505 milliseconds, and the tenth at 565 milliseconds after 0 time.

Similarly, the detonation times for each of the charges in the second, third, fourth, and fifth rows are given. It will now be seen that the detonation of the charges within a row occur at 60 milliseconds spacing, which as previously indicated is approximately optimum for the creation of fractures within a row. The charges within a row are usually spaced more closely than are the charges between rows in order that a clean face or fracture is obtained by a series of blasts.

It will be seen that the time delay between the charges in a particular circuit occur at 25 millisecond intervals, which is less than what has previously been indicated to be optimum. Nevertheless the blast schedule of FIG. 1 allows 50 individual blasts to occur without any two of the blasts occurring at the same instant. Since only 5 rows deep are being shot, it is felt that less than optimum time delay between rows can be utilized. Although the pattern does not give optimum rock removal, it holds stray projectiles to a minumum, it uses a minimum number of different denominations of time delay caps, and it allows great numbers of charges to be ignited in rows parallel to the open quarry face. The number of charges in the rows can be increased indefinitely without two blasts occurring at the same time. This is an obvious advantage of the blast schedule of FIG. 1 and it provides optimum spacing between charges for holding vibrations in nearby buildings to a minimum, as explained above.

The blast schedule of FIG. 2 is charted generally in the same manner as is the blast schedule of FIG. 1, but differs principally in that the time delay between individual circuits as determined by the blasting machine has been increased to 100 milliseconds. Because 100 milliseconds time delay is utilized between circuits, a total of only 40 charges can be ignited without having any two charges igniting at the same instant. The blast schedule of FIG. 2 demonstrates that effective fracture development within a particular row can still be had at 100 milliseconds, and otherwise has generally the same advantages as does the blast schedule of FIG. 1.

From an understanding of the blast schedule of FIGS. 1 and 2, it can now be seen that the greatest number of charges which can be set off without having two of the charges igniting at the same instant depends upon the least common denominator of the circuit interval and of the time delay interval that is used between rows. In the chart of FIG. 1, for example, the least common multiple of 25 and 60 is 300. 300 divided by 60 is 5, and 300 divided by 25 is 12, so that a total of 12 rows with 25 milliseconds time delay between each can be utilized before any duplication of detonation times occur. These intervals must be added to the delay time of the first blast to obtain the time delay for a particular blast, which is 25. This would give a total time delay of 325 which appears in row 1, circuit 6. So long as less than 12 intervals are utilized, any number of circuits can be used without giving two instantaneous blasts. Using the same analysis for the chart of FIG. 2 it will be seen that the least common denominator is 5 and that, therefore, only 4 rows can be utilized without having two blasts occuring instantaneously.

FIG. 3 is constructed utilizing the same nomenclature as was used for the charts of FIGS. 1 and 2. The schedule of FIG. 3 utilizes ignition circuits which ignite two adjacent blasts in each row. The wire for circuit 1, for example, has its positive terminal connected to the second charge in row 6 which is designated as a 650 millisecond delay cap and passes down over the second column and back up over the first column to be grounded after its connection to the first charge in row 6. The circuits 2 through 10 are similarly arranged to ignite two columns of charges. It will further be seen that a 50 millisecond time delay is used between adjacent columns, and 100 millisecond time delay is used between rows.

The blasting machine is set at 60 milliseconds time delay between circuits, so that a good compromise is achieved for optimum fracture in a row, and optimum rock removal between rows.

It will further be seen that the blast schedule divides itself into four sub-groups. The first sub-group contains rows 1, 2, and 3 of circuits 1 through 5; the second sub-group contains rows 4 through 6 of circuits 1 through 5; the third sub-group contains circuits 6 through 10 of rows 1 through 3; and the fourth sub-group contains circuits 6 through 10 of rows 4 through 6. It will be seen that the blasts in row 1, circuit 6 occurs at the same instant as the blast of row 4, circuit 1; and that thereafter there is a blast in sub-group 3 that occurs at the same instant as a blast in sub-group 2. As previously explained these blasts which occur simultaneously, are spaced by a sufficient predetermined distance so that the peak of the pressure wave of the blast of sub-group 3 falls generally in the valley of the pressure wave of the blast of sub-group 2 to approximately fill in the valleys between peaks of the pressure waves, rather than to have the peaks of the pressure waves add to each other.

It will be seen, however, that the blasts of the even numbered columns in row 6 do not correspond with the blasts of the even numbered columns in row 3 of sub-group 3 because there are 150 millisecond intervals between rows 6 and 5 in the even numbered columns. This gives between 40 and 100 millisecond delay between the blasts in row 6. The additional time delay between the explosions in rows 5 and 6 allow the rock ahead of row 6 to adequately move away and make room for the rock dislodged by the explosions in row 6. The blast schedule of FIG. 3 sequences 120 explosions at one "shooting" and produces generally no more vibration to buildings than does the explosion of a single charge. Prior to the present invention this result was not believed possible, and many governmental laws permitted no more than one blast to occur at a time under the same conditions. The sub-groups or blocks wherein detonations occur concurrently can be spaced by an appropriate distance to cause the high pressure portion of the wave from one blast to fill in the low pressure portion of the wave from the other blast using the following formula $x = m\,y/n$ wherein:

$x =$ the uniform circuit delay interval, $y =$ the between-row time delay interval, $n =$ the number of intervals between the ignition circuit energizations to give a predetermined composite time delay, and $m =$ the nubmer of between-row time delay intervals to give a predetermined composite time delay.

The necessary distance between the blasts is easily determined using the frequency of the shock wave in the rock and its known speed of propagation, from which the half wave distance can be ascertained. The spacing between the sub-groups or blocks will need to correspond generally to this half wave spacing. The spacing between blasts in a row is determined to give a clean breakage in the type of rock being removed and the amount of explosive per blast being utilized. The values of $n$ and $m$ are selected to provide blocks or sub-groups having a spacing which correspond to the half wave distance referred to above. Once $n$ and $m$ are selected, the $x$ and $y$ delays can be determined using the above formula. At least one of the values of $x$ and $y$ will usually be selected according to the criteria given above for optimum time delay within a row, or the optimum time delay between rows. The precise values of $x$ and $y$ are inter-related as shown by the formula, and their value will be adjusted or balanced so that both $x$ and $y$ will approximate optimum values.

It will now be seen that utilization of the principles of the present invention permits a far greater number of explosions to be detonated at a "shooting" than was possible heretofore, without increasing the shock vibration that is transmitted out of the blasting area. At the same time a greater efficiency per blast is obtained.

While the invention has been described in considerable detail, I do not wish to be limited to the particular embodiments shown and described; and it is my intention to cover hereby all novel adaptations, modifications, and arrangements thereof which come within the practice of those skilled in the art to which the invention relates, and which come within the scope of the following claims.

I claim:

1. A method of removing material from an open face of a quarry comprising the steps of: arranging a first column of blasting assemblies of progressively greater time delay periods in a column proceeding away from the quarry face, arranging a second column of blasting assemblies of progressively greater time delay periods in a column proceeding away from the quarry face, respective assemblies of said columns forming rows that are generally parallel to the quarry face and the assemblies of each row having generally the same time delay, causing a first electrical ignition circuit to be connected to said first column of blasting assemblies with the assemblies being in parallel circuit, causing a second electrical ignition circuit to be connected to said second column of blasting assemblies with the assemblies being in parallel circuit, and sequentially energizing said first and second ignition circuits at a time interval generally between approximately 10 and approximately 100 milliseconds to achieve a successive peeling type of crack propagation in the successive rows of material.

2. The method of claim 1 wherein said time interval between energization of said circuits and the number of rows is selected so that no two blasts occur simultaneously within approximately a half shock wave distance in the material being removed.

3. The method of claim 1 wherein said time interval and rows are selected so that two blasts occur simultaneously at approximately a half shock wave distance apart in the material being removed.

4. The method of claim 1 wherein the time delay between rows is between approximately 25 and 100 milliseconds to hold pressure on succeeding blasts, and the time delay between columns is between approximately 60 and 100 milliseconds for optimum peeling action.

5. A method of removal of material from an open quarry face comprising: arranging a plurality of blasting charges in a succession of generally parallel rows generally parallel to the open quarry face and with the repsective members of each row being arranged in columns which proceed away from the quarry face, and sequentially detonating the respective charges in each column with a time delay between charges of from approximately 25 to 100 milliseconds to hold pressure at each succeeding charge to provide improved fissure production while also sequentially detonating the respective charges in each row with a time delay between approximately 10 and 100 milliseconds to provide improved crack propagation between fissure by means of a peeling action.

6. The method of claim 5 wherein no two detonations occur at the same time unless they are spaced apart by a distance corresponding generally to at least the half shock wave distance in the material being removed.

7. A method of blasting comprising: providing a plurality of rows of blast igniters with igniters in a particular row having generally the same time delay, but with the time delay of succeeding rows being of increasing time delay periods, providing a first electrical circuit connecting the first respective blast igniter of each row, providing a second electrical circuit connecting a different respective blast igniter of each row, and providing means energizing said second circuit after said first circuit with a time delay different from that used in said rows but which time delay is less than the largest time delay used in said rows, to produce a staggered arrangement of blasts which alternates between rows and in which no two blasts occur at the same.

8. The method of claim 7 including the steps of: providing additional igniters respective ones of which are located in each row and which are positioned between said igniters previously referred to, said additional igniters having time delay periods which differ from each other, and each of which differs from those previously referred to in its rows, and providing means energizing said additional igniters simultaneously with energization of said first circuit.

9. The method of claim 7 wherein the time delay between rows is at least 25 milliseconds, and said second circuit is energized approximately 60 milliseconds after said first circuit.

10. The method of claim 7 wherein the time delay between rows is approximately 100 milliseconds, and said second circuit is energized approximately 60 milliseconds after said first circuit.

11. The method of claim 8 wherein said second circuit is energized after said first circuit with a time delay which is greater than the minimum time delay period and less than the maximum time delay period of the igniters in the said first row.

12. The method of claim 8 wherein the time delay interval of said second series is approximately 60 milliseconds.

13. A method of blasting comprising the steps of: arranging a multiplicity of blasting assemblies in rows that run in one direction and columns that run at generally right angles to the rows with the blast assemblies in the columns having increasing time delay periods, causing the time delay periods of the assemblies within a row to be greater in the second and fourth columns than in the first and third columns by a generally predetermined in-row time delay interval, causing the time delay periods of the assemblies of each column to increase by a generally predetermined between-row time delay interval, causing a first electrical ignition circuit to be connected to the first and second columns of said assemblies with the assemblies being in parallel, causing a second electrical ignition circuit to be connected to the third and fourth columns of said assemblies with the assemblies being in parallel, and energizing said second circuit after said first circuit with a time delay interval that is greater than the in-row time delay interval.

14. The method of claim 13 including the step of energizing said second circuit after said first circuit with a time delay interval that is less than said between-row time delay interval.

15. The method of claim 14 wherein said second circuit is energized after said first circuit by an interval of approximately 60 milliseconds.

16. The method of claim 15 wherein said in-row time delay interval is approximately 50 milliseconds and said between-row time delay interval is approximately 100 milliseconds.

17. A method of blasting comprising the steps of: arranging a multiplicity of blasting assemblies in rows that run in one direction and columns that run at generally right angles to the rows with the blasting assemblies in the columns having increasing time delay periods, providing a plurality of individual electrical ignition circuits, connecting the blasting assemblies of predetermined columns to predetermined electrical ignition circuits with the blasting assemblies in parallel, and sequentially energizing said ignition circuits at times spaced apart by a uniform circuit delay interval determined by the formula $x = m\, y/n$ wherein:

$x$ = said uniform circuit delay interval,
$y$ = said between-row time delay interval,
$n$ = the number of intervals between the ignition circuit energizations to give a predetermined composite time delay, and
$m$ = the number of between-row time delay intervals to give said predetermined composite time delay, to provide an arrangement wherein the blasting assemblies are ignited sequentially in repeating spaced apart blocks with no more than one assembly in each block being ignited simultaneously with an assembly in another one of the blocks.

18. The method of claim 17 including the steps of: causing the time delay periods of the assemblies within a row to be greater in the even number columns than in the odd number columns by a generally predetermined in-row time delay interval, and causing respective electrical ignition circuits to be connected to the assemblies of both an odd and an adjacent even number column.

* * * * *